Dec. 13, 1938.   C. BATCHELLER   2,140,067
SIGN OR LICENSE PLATE
Filed July 27, 1937
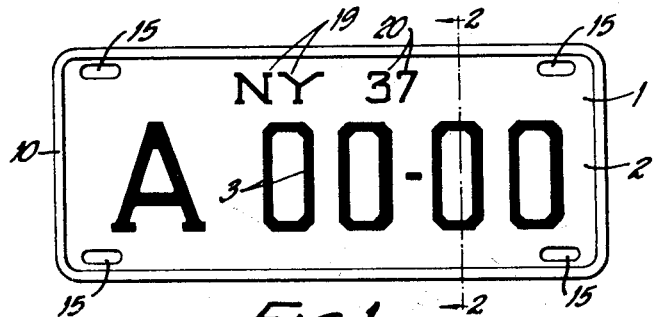
Fig.1
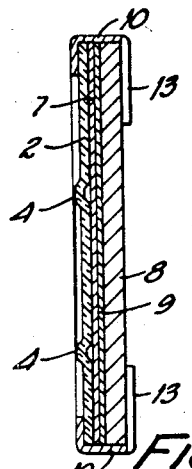
Fig.2
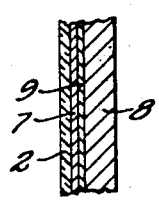
Fig.6
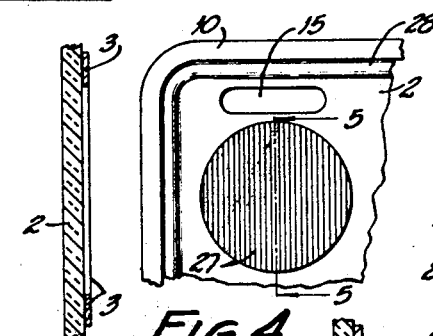
Fig.7  Fig.4
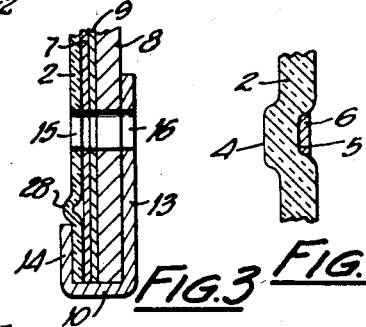
Fig.3  Fig.8
Fig.5
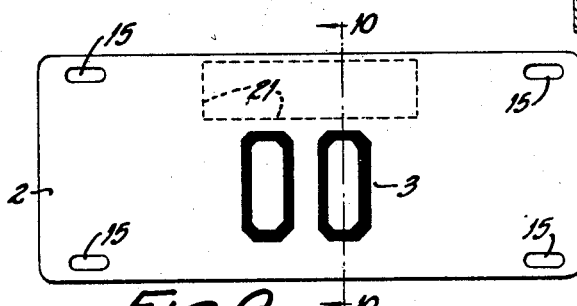
Fig.9
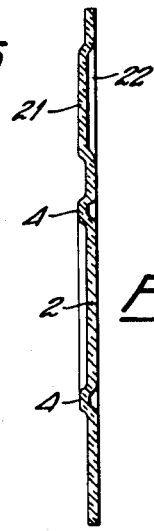
Fig.10
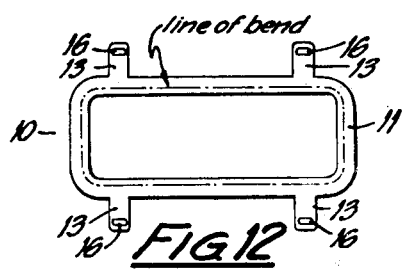
Fig.12
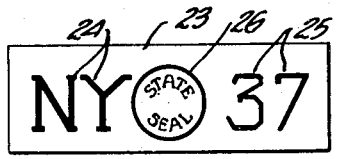
Fig.11
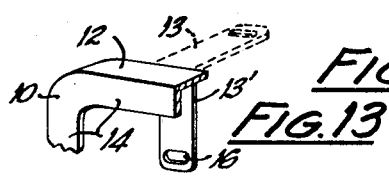
Fig.13
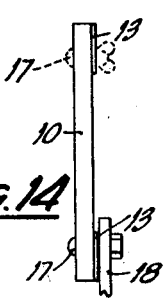
Fig.14
INVENTOR
Clements Batcheller
By
ATTORNEY

Patented Dec. 13, 1938

2,140,067

UNITED STATES PATENT OFFICE 2,140,067

SIGN OR LICENSE PLATE

Clements Batcheller, Glens Falls, N. Y., assignor to Allegheny Ludlum Steel Corporation, Pittsburgh, Pa., a corporation of Pennsylvania Application July 27, 1937, Serial No. 155,944

5 Claims. (Cl. 40—125)

My invention relates to improvements in signs, and particularly in road signs, license plates and the like which, in use, are positioned to be illuminated either directly or indirectly by the head lights of motor vehicles. While the invention is to be understood as not limited to license plates for automobiles, it is particularly adapted therefor and the principle of the invention will be illustrated and explained in connection therewith.

License plates for motor vehicles in most States are changed both in number and color from year to year, although at the present time at least one State has adopted a more or less permanent type of plate provided with means whereby only an attached portion thereof is changed each year. The annual replacement of the all-metal type of sign or license now almost universally used is a very costly proposition not only because of the cost of the signs themselves and the bookkeeping expense involved in changing the records annually, but also because the licensees must, or at least in most cases do, go personally or send representatives to distribution centers to obtain their new licenses. Moreover, signs of the present type which consist usually of embossed and enamel coated sheets or strips of cheap metal are not particularly durable and are not designed for a useful and legible life of longer than about one year.

The maintenance of road signs is also very expensive. Signs of this type which some years ago were usually made of wood are being rapidly replaced in most States by cast iron signs, but even these must be repainted every year or so in order to maintain them in readable condition.

One of the objects of my invention, therefore, is to provide a sign or license plate of substantially greater durability and longer life than those now in use. Another object is to provide a device of this character which is readily discernible and easily readable at greater distances than the devices now commonly used. Another object is to provide a device of this character in which, if necessary, the readable portion may be quickly and cheaply replaced as a unit. Another object is to provide a license plate for automobiles of extremely light but strong construction in which the portion bearing the license-identifying characters may be replaced each year, if desirable, at considerably less cost than the present type of plates, or in which the portion bearing the license-identifying characters may be used for two or more years but in which a year-identifying insert may be placed annually. A further object is to provide a novel form of license plate comprising a plurality of sheet elements which are bound together and adapted to be secured to an automobile in a novel and useful way.

With these objects in view, my invention includes the novel elements and the combinations and arrangements thereof described below and illustrated in the accompanying drawing in which—

Fig. 1 is an elevation view of my license plate assembly;

Fig. 2 is a vertical cross section, to an enlarged scale, in the plane 2—2 of Fig. 1;

Fig. 3 is a fragmentary cross section similar to Fig. 2 but to a somewhat larger scale showing a detail;

Fig. 4 is a fragmentary elevation view of a detail;

Fig. 5 is a section of Fig. 4 in the plane 5—5;

Fig. 6 is a fragmentary cross section, to an enlarged scale, of the various sheets going to make up my sign;

Fig. 7 is a fragmentary cross section, to an enlarged scale, showing one of the ways in which the letter or license-identifying characters are affixed to the sign;

Fig. 8 is a fragmentary cross section showing how the letters or identifying characters may be embossed and colored;

Fig. 9 is an elevation view of a modified type of license plate;

Fig. 10 is a cross section, to an enlarged scale, of Fig. 9 in the plane 10—10;

Fig. 11 is an elevation view of an annual insert;

Fig. 12 is a plan view of a metal blank used to form the frame;

Fig. 13 is a fragmentary perspective view of the frame corner; and

Fig. 14 is an end elevation view of the license plate attached to a support on the automobile.

Referring to the drawing, 1 represents generally a license plate embodying some of the features of my invention. In the case of a license plate, the license-identifying characters, and in the case of a sign, the letters or other designations thereon, are carried by a flexible, preferably transparent film or sheet 2 of a distinctive tint or color, such for example as yellow. Such sheet may be of any suitable, non-brittle and preferably flexible material which will be permanently transparent and of a permanent color. I prefer to use cellulose acetate because of its cheapness, flexibility and transparency combined with its stability after long exposure to sunlight and all kinds of weather conditions. Furthermore, this material is thermoplastic in character and may be moderately "deep formed" in a die or mold. However, sheets or films of nitrocellulose, vinyl films and other resinous materials having the above characteristics may be used. A comparatively new thermoplastic material, methyl methacrylate, and which is sold under the trade name of "Lucite" or "Pontalite" is particularly well adapted for my purpose. Such sheets can be obtained in almost any reasonable size, thickness and transparent color desired, although sheets of a thickness say from about .018" to .020" are heavy enough to serve my purposes. The letters or license-identifying characters may be formed by adhesively securing or printing them on the back of the sheet 2 as shown at 3 (see Figs. 1 and 7), or they may be embossed therein as shown at 4 in Figs. 2, 8 and 10. The characters are opaque, and if embossed, the depressions formed in the back of the sheet 2, as shown at 5 (Fig. 8), may be filled with paint or any other opaque coloring material 6.

Immediately behind the transparent sheet 2 I position a sheet of reflecting material 7 which is preferably a corrosion-resistant alloy steel having a highly polished, lustrous surface adapted to reflect light through the transparent zones in the sheet 2. I prefer to use a stainless steel as a reflecting unit because of the permanency of its lustrous surface which will not corrode, tarnish or diminish in brilliancy when exposed to atmospheric conditions. Where a cheaper and less permanent construction will serve the purpose, it is possible to use certain of the white metals or alloys such as tin, nickel, aluminum, etc. in the form of thin sheets or foils. However, in such case the brilliancy of the material may be somewhat prolonged by coating the polished surface with a heavy film of transparent lacquer.

The back of the sign is formed by a comparatively heavy, say 30 gauge, steel sheet 8 which has been dipped in lacquer to prevent corrosion. Where a stainless steel reflecting sheet is used, it may be of relatively thin gauge, say from .005" to .015" in thickness and, in order to prevent electrolysis between the reflecting sheet 7 and the backing steel sheet 8 I interpose therebetween an insulating layer 9 preferably formed of asphalt impregnated paper which is adhesively secured to the back of the reflecting sheet 7.

The sheets which form my sign are preferably held in assembled relation by means of a suitable surrounding frame 10 shown in detail in Figs. 12 and 13. A sheet or strip, preferably of stainless steel, is blanked out, as shown at 11, with the tongues or projections 13 extending from the top and bottom thereof. The frame may be die formed to the L-section shown at 12 in Fig. 13 to form a frame having an inwardly projecting lip all around the front, as shown at 14. The sheet assembly is provided with slotted perforations 15, and the tongues 13 are provided with correspondingly slotted openings 16 therein. When the tongues are bent downwardly to the position 13', as shown in Fig. 13, the openings 16 therein will register with the slotted openings 15 through the sheet assembly. Bolts 17 may then be passed through the openings 15 in the sheet assembly and the openings 16 in the tongues and thus secure the frame and sheet assembly together as a unit. Either the bolts through the upper or the lower part of the assembly may be used to secure the plate to a bracket 18 on an automobile as shown in Fig. 14.

Where the plate is to be used for only one year, characters 19 designating the state, and characters 20 designating the year, may be formed in or on the back of the sheet 2 as described above.

Where the license plate is intended to be of a more or less permanent character, that is to say, where it is intended to be used for more than one year, I emboss or forwardly offset the upper central portion of the transparent sheet 2 as shown at 21 in Figs. 9 and 10, thus forming in the back of the sheet a depression 22 adapted to receive an annual insert strip 23 such as shown in Fig. 11. This strip may comprise a thin sheet of cellulose acetate or other material and has printed thereon characters 24 designating the state and characters 25 designating the year. These characters are preferably in a distinctive color. Between the characters 24 and 25 the state seal may be embossed in the strip 11 as shown at 26 to make counterfeiting more difficult.

Referring to Figs. 4 and 5, my sign or license lends itself readily to the formation thereon of red danger signals by adhesively securing to the back of the sheet 2 a thin red disc or film 27 of transparent material such as cellulose acetate. Where the color tint of the transparent zone of the sheet 2 is not too deep, I find that colors such as a bright red will appear red by light reflected through the tinted sheet.

In order to prevent water from running down the face of the license plate and between the frame and the sheet 2 at the bottom, I prefer to press out or emboss a bead 28 in the sheet 2 which will be positioned in the assembly just above the edge of the frame lip 14.

While some objections have been registered to the dazzling effect produced by light reflected from metal license plates having a lustrous surface, it will be found that my plate is not open to this objection. While I obtain maximum brilliancy and visibility by means of my lustrous reflecting sheet, the light reflected therefrom in passing through the colored sheet 2 is more or less diffused and will not dazzle the eyes of approaching drivers.

From the foregoing it will be apparent that where it is desirable to change the license numbers each year, only the transparent sheets 2, which are very light and very flexible, need be changed. On the other hand, where a user is permitted to hold the same numbers indefinitely, it is only necessary for the state to issue two insert strips each year which are so light and small as to be mailable at minimum postage rates.

What I claim is:

1. A device of the character described comprising a facing sheet having transparent and opaque zones of contrasting color therein arranged to define characters, such as letters or numerals, means behind and contiguous said sheet having a lustrous, light-reflecting surface adapted to reflect light through the transparent zones of said sheet; a frame having portions engaging the face of said device about the periphery thereof and provided with bendable tongues overlying the back of said device, and bolts extending through said facing sheet, said light-reflecting means and said tongues for securing the whole together.

2. An automobile license plate of the permanent type comprising a colored, transparent sheet of flexible, thermoplastic material having opaque zones therein of a color contrasting with the color of said flexible sheet and arranged to define license-identifying characters, a forwardly offset zone in said sheet adapted to permit an annual indicating card to be positioned therein and appear therethrough, means behind and contiguous said sheet having a lustrous, light-reflecting surface adapted to reflect light through said sheet, and a frame securing said sheet and said light-reflecting means together in assembled relation with said annual indicating card therebetween.

3. A device of the character described comprising a facing element of flexible, transparent material having opaque zones thereon defining characters, such as letters or numerals, a sheet of thin-gauge, flexible, corrosion-resisting metal having a lustrous, light-reflecting surface contiguous and coextensive with the back of said facing element, a sheet of electrical insulating material substantially coextensive with and adhesively secured to the back of said metal sheet, and a frame surrounding and protecting the edges of said facing, metal and insulating material and securing the whole together in compactly assembled relation.

4. A device of the character described comprising a facing element of flexible, transparent material having opaque zones thereon defining characters, such as letters or numerals, a sheet of thin-gauge, flexible, corrosion-resisting steel having a lustrous, light-reflecting surface contiguous and coextensive with the back of said facing element, a substantially rigid, metal, backing element, a sheet of electrical insulating material intermediate said steel and said backing element, and a frame securing the whole together in compactly assembled relation.

5. A device of the character described comprising a facing element of flexible, transparent material having opaque zones thereon defining characters, such as letters or numerals, a sheet of thin-gauge, flexible, corrosion-resisting steel having a lustrous, light-reflecting surface contiguous and coextensive with the back of said facing element, a substantially rigid, metal, backing element, a sheet of electrical insulating material substantially coextensive with and adhesively secured to the back of said steel sheet, whereby to prevent electrical contact between said sheet and said metal backing element, and a frame surrounding and protecting the edges of said elements and said insulating material and holding them together in compactly assembled relation.

CLEMENTS BATCHELLER.